United States Patent
Zhu

(10) Patent No.: US 11,388,581 B2
(45) Date of Patent: Jul. 12, 2022

(54) ROBUST ADJUSTMENT OF ACCESS AND MOBILITY MANAGEMENT FUNCTIONS

(71) Applicant: ZTE Corporation, Guangdong (CN)

(72) Inventor: Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 87 days.

(21) Appl. No.: 16/969,941

(22) PCT Filed: Jun. 20, 2017

(86) PCT No.: PCT/CN2017/089202
§ 371 (c)(1),
(2) Date: Aug. 13, 2020

(87) PCT Pub. No.: WO2018/232599
PCT Pub. Date: Dec. 27, 2018

(65) Prior Publication Data
US 2020/0413245 A1    Dec. 31, 2020

(51) Int. Cl.
*H04W 8/26* (2009.01)
*H04W 8/12* (2009.01)
*H04W 80/06* (2009.01)
*H04W 84/04* (2009.01)
(Continued)

(52) U.S. Cl.
CPC ............... *H04W 8/12* (2013.01); *H04W 8/26* (2013.01); *H04W 80/06* (2013.01); *H04W 84/042* (2013.01); *H04W 92/04* (2013.01); *H04W 92/24* (2013.01)

(58) Field of Classification Search
CPC .......... H04W 80/06; H04W 8/04; H04W 8/12
See application file for complete search history.

(56) References Cited

U.S. PATENT DOCUMENTS

| 10,264,506 | B2 * | 4/2019 | Faccin | H04W 36/385 |
| 2012/0113887 | A1 | 5/2012 | Shen et al. | |
| 2012/0213140 | A1 | 8/2012 | Olsson et al. | |

(Continued)

FOREIGN PATENT DOCUMENTS

| CN | 101730056 A | 6/2010 |
| CN | 103380635 A | 10/2013 |

(Continued)

OTHER PUBLICATIONS

Cisco Systems, Inc. "Adding N2 requirements and procedures to TS 23.502" 3GPP SA WG2 Meeting #S2-121 S2-173530, May 19, 2017 (May 19, 2017), Hangzhou, China (3 pages).

(Continued)

*Primary Examiner* — Michael T Vu
(74) *Attorney, Agent, or Firm* — Foley & Lardner LLP

(57) ABSTRACT

A method and apparatus for robust adjustment of access and mobility management functions are disclosed. In one embodiment, a method includes: receiving a radio access network (RAN)-user equipment (UE) identifier from a first access and mobility management function (AMF), the RAN-UE identifier configured to identify a UE or UE context for a RAN; producing an AMF-UE identifier, the AMF-UE identifier configured to identify the UE or UE context for a second AMF; selecting a transport network layer association (TNLA) link towards a RAN; and sending the AMF-UE identifier to the RAN.

4 Claims, 6 Drawing Sheets

(51) Int. Cl.
*H04W 92/04* (2009.01)
*H04W 92/24* (2009.01)

(56) References Cited

U.S. PATENT DOCUMENTS

2020/0413245 A1    12/2020  Zhu
2021/0212131 A1*    7/2021  Futaki .................... H04W 8/24

FOREIGN PATENT DOCUMENTS

| CN | 103404227 A | 11/2013 |
| EP | 2 782 407 A1 | 9/2014 |
| WO | WO-2018/232599 A1 | 12/2018 |

OTHER PUBLICATIONS

Cisco Systems, Inc. et al. "Addressing editor's notes in S2-I72812" 3GPP SA WG2 Meeting #S2-121 S2-173528, May 19, 2017 (May 19, 2017), Hangzhou, China (9 pages).
International Search Report and Written Opinion for PCT Appl. No. PCT/CN2017/089202 dated Feb. 26, 2018 (with English translation, 7 pages).
Nokia et al. "TS23.501: Way forward and Solution for change of AMF/Control of N2 persistence" 3GPPSA WG2Meeting#I21 S2-173151, May 19, 2017 (May 19, 2017), Hangzhou, China (9 pages).
First Office Action for CN Appl. No. 201780092390.1, dated Jul. 3, 2020 (with English translation, 28 pages).
Cisco Systems, Inc. et al.: "N2 Persistence Control Way Forward"; SA WG2 Meeting #S2-120; S2-172710; Mar. 31, 2017; Busan, South Korea (3 pages).
Nokia: "N2 Persistence Control"; SA WG2 Meeting #121; S2-173150; May 8, 2017; (13 pages).
Nokia: "N2 Persistence Control-Connected Mode" SA WG2 Meeting #121 S2-173150; May 8, 2017 (13 pages).
Second Office Action for CN Appl. No. 201780092390.1, dated Mar. 25, 2021 (with English translation, 10 pages).
First Examination Report for CA Appl. No. 3091404, dated Mar. 28, 2022 (3 pages).
Cisco Systems, Inc. et al., "N2 persistence control way forward", SA WG2 Meeting #S2-120, Mar. 27-31, 2017, Busan, South Korea, S2-172812; Apr. 3, 2017 (3 pages).
First Search Report for SG Appln. No. 11202007928Y, dated May 17, 2022 (7 pages).

* cited by examiner

ROBUST ADJUSTMENT OF ACCESS AND MOBILITY MANAGEMENT FUNCTIONS

CROSS-REFERENCE TO RELATED APPLICATION

This application claims priority under 35 U.S.C. § 371 as a U.S. National Stage of International Patent Application No. PCT/CN2017/089202, filed on Jun. 20, 2017, the entire disclosure of which is hereby incorporated by reference.

TECHNICAL FIELD

The disclosure relates generally to wireless communications and, more particularly, to systems and methods for selecting and allocating access and mobility management functions for a user equipment (UE) device.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. The performance requirements placed on the network will demand connectivity in terms of data rate, latency, QoS, security, availability, and many other parameters, all of which will vary from one service to the next. Thus, enabling a network to allocate resources in a flexible manner to provide customized connectivity for each different type of service will greatly enhance the network's ability to meet future demands.

As used herein, the term "network" or "communication network" refers to infrastructure resources provided by a network operator to provide data communication services, which may include both wired and wireless services, to customers of the network operation. Examples of such network operators include AT&T, Verizon, Sprint, Vodafone, etc. Such a network may include a core portion, a radio access network (RAN) portion and backhaul portion, for example. The network may further comprise various virtualized resources and functions as would be understood by persons of ordinary skill in the art. As these networks adopt the next generation network standards (i.e., 5G), referred to as "5G networks," they will become capable of dynamic reconfiguration, as described in further detail below.

FIG. 1 illustrates an exemplary conventional architecture of a 5G communication system that spans two networks. The two networks may include a visited serving network 100, which may include a user equipment (UE) 102, access and mobility management function (AMF) 104, 5G random access network (RAN) 106, visited session management function (vSMF) 108, and a visited user plane function (vUPF) 110, as will be discussed further below. The two networks may also include a home network 120 (of the UE 102), which may include a home session management function (hSMF) 122, home user plane function (hUPF) 124, and a data network 126, as will be discussed below.

Both the visited network 100 and the home network 120 may be public land mobile networks (PLMN's), for example. In this example scenario, the UE device 104 is roaming away from its home network 120 and is located in the visited, serving network 100. The visited network 100 includes the access and mobility management function (AMF) 104 which performs various access management functions that allow the UE 102 to access the 5G random access network (RAN) 106. The visited network 100 further includes the visited session management function (vSMF) 108 and the visited user plane Function (vUPF) 110. The AMF 104 includes the following functionalities: registration management, connection management, reachability management and mobility management. This AMF 104 also performs access authentication and access authorization functions for the UE. The AMF 104 is also the non-access stratum (NAS) security termination and relays the session management (SM) NAS between the UE 102 and vSMF 108, etc.

The vSMF 108 performs the following functions: session management (e.g., session establishment, modification and release, UE IP address allocation & management (including optional authorization functions), selection and control of UP function, downlink data notification, etc. The vUPF 110 includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc. Persons of ordinary skill in the art are familiar with the conventional functions of the vSMF 108 and vUPF 110.

The home network 120 includes the home SMF 122, which has the same or similar conventional functions for the home network 120 as those described above for the vSMF 108. The home network 120 further includes the home UPF 124, which as the same or similar conventional functionality as the vUPF 110 discussed above. At least one data network 126 also resides within the home network 120, which is a network providing service to the UE 102, such as the IMS network, Internet, etc. It is understood that FIG. 1 does not include all of the infrastructure, components, resources and functions of a 5G network but, rather, only a subset of the infrastructure, components, resources and functions that are pertinent to the present disclosure.

As used herein, the term "function" refers to one or more virtual functions performed by one or more physical resources of a network, which are configured to perform the corresponding function. Such physical resources can include one or more processors, computers, servers, memories, databases, communication interfaces, etc. that may be co-located in a single network communication node or distributed among multiple nodes. Persons of ordinary skill in the art would be familiar with how the "functions" discussed herein can be implemented via hardware, firmware, software or any combination of these techniques.

FIG. 2 illustrates an exemplary conventional architecture 200 of a mobile communication system. In the architecture 200, at least one UE 202 may be in communication with a radio access network (RAN) 204, as discussed above.

The RAN 204 may be in communication with one or more AMFs 208 (e.g., two AMFs 208 in the illustrated embodiment), as discussed above. The at least one UE 202 may be in communication with the one or more AMFs 208 across an N1 interface (not shown), as known in the art. The RAN 204 may be in communication with the one or more AMFs 208 across an N2 interface 210, as noted with dotted lines. The N2 interface will be discussed in greater detail below. The one or more AMFs 208 may share access to a context database (CDB) 212 to share information concerning one or more UEs 202 that the RAN 204 may interact with. The information stored in the CDB 212 and shared among the one or more AMFs 208 may be UE context information concerning a UE context of the one or more UEs 202. The UE context information may be information that may facilitate a relationship between the one or more AMFs 208 and the one or more UEs 202. A UE context may be a term for a body of UE context information related to a UE of the one or more UEs 202. Examples of UE context information may include a UE identifier, a UE security state parameter, a UE mobile state parameter, a UE mobility parameter, a UE subscription parameter, and the like. When the UE 202 is in connected mode with the RAN 204, the UE context information may also include RAN related context information such as N2AP UE associations, as will be discussed further below.

FIG. 3 is a block diagram of the N2 interface 210 discussed above in connection with FIG. 2. As discussed above, the RAN 204 may be in communication with one or more AMFs 208 across the N2 interface 210. For simplicity of discussion, the one or more AMFs 208 will be discussed below (and illustrated in FIG. 3) as a single AMF 208. The RAN 204 may be in communication with the AMF 208 by utilizing an N2 application protocol (N2AP) 302, implemented locally at the RAN 204 and the AMF 208. The N2AP protocols 302, as implemented locally at the RAN 204 and the AMF 208 may establish an N2AP UE association link 304 between the RAN 204 and the AMFs 208. N2AP UE association link 304 may be a logical, per UE association between the RAN 204 and the AMF 208 (e.g., effectuated by unique identifiers that may map the RAN 204, the AMF 208 and a UE together, as will be discussed below). The N2AP UE association link 304 may be established when the UE is in connect mode. A UE may be in connect mode when the UE is actively transmitting or receiving data during an established session with the RAN 204.

The N2AP UE association link 304 may utilize a RAN-UE identifier such as a RAN UE N2AP ID allocated by the RAN 204. The N2AP UE association link 304 may also utilize an AMF-UE identifier (e.g., identification (ID)), such as an AMF UE N2AP ID allocated by the AMF 208, which identifies the UE context in the AMF 208. These RAN-UE identifiers and AMF-UE identifiers may be utilized for UE associated messages (which may also be associated with a corresponding UE context) transmitted across the N2 interface 210. For example, for UE associated messages transmitted across the N2 interface 210, the AMF 208 may identify the associated UE based on the AMF UE N2AP ID. Also, for UE associated messages transmitted across the N2 interface 210, the RAN 204 may identify the associated UE based on the RAN UE N2AP ID.

The RAN 204 and the AMF 208 may also communicate across the Transport Network Layer (TNL) by utilizing a TNL protocol 306, implemented at each of the RAN 204 and the AMF 208. Implementation of the TNL protocol 306 may establish a TNL association (TNLA) link 308 between the RAN 204 and the AMF 208. The TNLA link 308 may be a logical association at the transport network layer (TNL) between RAN 204 and AMF 208, from which information between the RAN 204 and the AMF 208 may be transferred. Examples of TNLA links 308 may include the stream control transmission protocol (SCTP) association defined in the standard IETF RFC 4960. Although only three are illustrated, there may be any number of TNLA links between the RAN 204 and AMF 208.

The association between a N2AP UE association link 304 and the TNLA link 308 may be termed as a N2AP UE-TNLA-binding, which represents a binding (e.g., association) between links 304 and 308 and a particular UE. For example, the binding may be between a N2AP UE association link and a TNL association link for a given UE. The binding may be on a per UE basis (e.g., specific to a UE). For example, the N2AP protocol may be used for signaling between the RAN 204 and the AMF 208. Also, there may be multiple TNLA links 308 between a RAN 204 and AMF 208. Accordingly, when the UE communicates with the RAN 204, the RAN may select one TNLA link among the multiple TNLA links 308 for messaging across the N2 interface 210.

FIG. 4 illustrates a method 400 of performing binding in accordance with the N2AP UE-TNLA-binding discussed above. This type of binding may be performed when a UE 402 initiates a service request to a RAN 404 from an idle state (e.g., not in the connected mode discussed above). At operation 1, the UE 402 initiates a radio resource control (RRC) setup procedure to establish a signaling radio link between the UE 402 and the RAN 404.

At operation 2, the RAN perform AMF selection based on the information provided by the UE in operation 1 as part of the RRC set up procedure. Specifically, as part of the RRC set up procedure, the RAN 404 may select the AMF 406 that communicates with the RAN 404. The RAN 404 may select the AMF 406 based on a temporary identifier (e.g., ID), provided by the UE 402 as part of the set up RRC procedure, from which the RAN 404 may identify the AMF 406. The RAN 404 may also allocate a RAN-UE identifier, such as a RAN UE N2AP ID, which identifies the UE for the RAN 404. The RAN UE N2AP ID may be allocated (e.g., produced) by the RAN 404 dynamically and be used to identify the UE for the RAN 404 (e.g., to reference a specific UE 402 when communicating with, or at, the RAN 402). The RAN 404 may also select a TNLA link (also termed as a selected TNLA link) between the RAN and the selected AMF 406 for subsequent communication with the AMF 406.

At operation 3, the RAN 404 may send an uplink message across the N2 interface from the RAN 404 to the AMF 406, also termed as an uplink N2 message. The uplink N2 message may be sent via the selected TNLA link to the AMF 406. The N2 message may include the RAN UE N2AP ID.

At operation 4, the AMF 406 may store the RAN UE N2AP ID locally. The AMF 406 may also allocate (e.g., produce) an AMF-UE identifier such as an AMF UE N2AP ID, which identifies the UE context in (or for) the AMF 406, in response to receiving the RAN UE N2AP ID. The AMF UE N2AP ID may be allocated (e.g., produced) by the AMF 406 dynamically and be used to identify the UE 402 at the AMF 406.

The AMF may also store binding information that associates the UE 402, the AMF-UE identifier (e.g., the AMF UE N2AP ID), and the RAN-UE identifier (e.g., RAN UE N2AP ID) and the selected TNLA link via which the AMF 406 received the N2 message. The stored binding information may be termed as N2AP UE-TNLA-binding information. The binding information may be stored in response to receiving the RAN UE N2AP ID. Accordingly, the N2AP UE-TNLA-binding information may be a mapping between (e.g., information that associates) the UE 402, the RAN 404, the AMF 406, and the selected TNLA link via which the AMF received the N2 message.

At operation 5, the AMF 406 may send a downlink N2 message (e.g., a message across the N2 interface from the AMF 406 to the RAN 404), via the selected TNLA link (e.g., the TNLA link used in operation 3) to the RAN 404. This N2 message may include the AMF UE N2AP ID.

At operation 6, the RAN 404 may store the AMF UE N2AP ID (received from the AMF 406). The RAN 406 may also update existing (e.g., maintained) N2AP UE-TNLA-binding information at the RAN 406, which may be updated in response to receiving the AMF UE N2AP ID. For example, the RAN 404 may store the AMF UE N2AP ID (received from the AMF 406) in the existing N2AP UE-TNLA-binding information maintained at the RAN 404. Accordingly, the N2AP UE-TNLA-binding information may, in effect, be the same as the N2AP UE-TNLA-binding information discussed in connection with operation 4 above (e.g., be a mapping between the UE 402, the RAN 404, the AMF 406, and the selected TNLA link via which the RAN received the downlink N2 message and the uplink N2 message).

At operation 7, the RAN 404 may send a subsequent uplink N2 message to the AMF 405 via the same selected TNLA link as used for the N2 messages discussed above. The subsequent uplink N2 message may reference the AMF UE N2AP ID.

When the UE 402 is in connected mode, an operator of the UE 402 may want to move a UE context from the AMF 406 to another AMF without changing (e.g., switching) an associated RAN, such as when the AMF 406 is to be taken offline (e.g., shut down). Typically, changing AMFs may require the UE 402 and RAN 404 to repeat the method 400 of performing binding, as discussed above. However, repeating the method 400 each time that the UE context is moved from one AMF to another AMF may be resource intensive, especially at the UE 402. Therefore, there is a need for improved methods for changing (e.g., adjusting, or hand off between) AMFs without changing an associated RAN when the UE is in connected mode.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: receiving a radio access network (RAN)-user equipment (UE) identifier from a first access and mobility management function (AMF), the RAN-UE identifier configured to identify a UE or UE context for a RAN; producing an AMF-UE identifier, the AMF-UE identifier configured to identify the UE or UE context for a second AMF; selecting a transport network layer association (TNLA) link towards a RAN; and sending the AMF-UE identifier to the RAN.

In a further embodiment, a method includes: receiving a message including a first access and mobility management function (AMF)-user equipment (UE) identifier that identifies a UE or UE context for a first AMF from the radio access network (RAN); retrieving UE context information from a data store using the first AMF-UE identifier; producing a second AMF-UE identifier, the second AMF-UE identifier configured to identify the UE or UE context for a second AMF; and sending the second AMF-UE identifier to the RAN.

In another embodiment, an apparatus includes: a receiver configured to receive a radio access network (RAN)-user equipment (UE) identifier from a first access and mobility management function (AMF), the RAN-UE identifier configured to identify a UE or UE context for a RAN; at least one processor configured to: produce an AMF-UE identifier, the AMF-UE identifier configured to identify the UE or UE context for a second AMF; and select a transport network layer association (TNLA) link towards a RAN; and a transmitter configured to send the AMF-UE identifier to the RAN.

In yet another embodiment, an apparatus includes: a receiver configured to receive a message including a first access and mobility management function (AMF)-user equipment (UE) identifier that identifies a UE or UE context for a first AMF from the radio access network (RAN); at least one processor configured to: retrieve UE context information from a data store using the first AMF-UE identifier; and produce a second AMF-UE identifier, the second AMF-UE identifier configured to identify the UE or UE context for a second AMF; and a transmitter configured to send the second AMF-UE identifier to the RAN.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings presented herein should not be considered limiting of the breadth, scope, or applicability of the invention. It is also noted that for clarity and ease of illustration, the drawings are not necessarily drawn to scale.

DETAILED DESCRIPTION OF EXEMPLARY EMBODIMENTS

Figure 1:
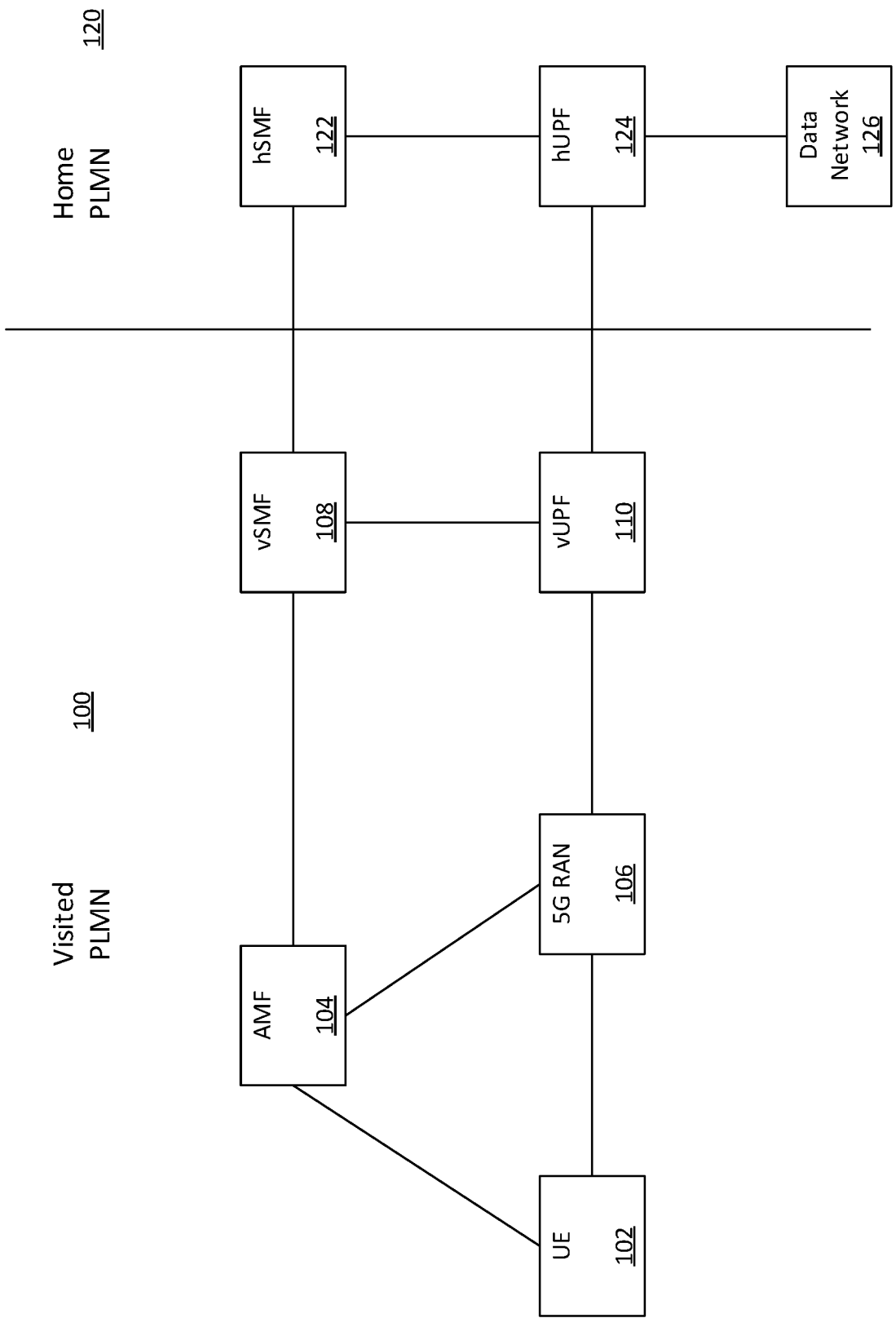
FIG. 1 illustrates a conventional 5G communication system comprising two networks.
Figure 2:
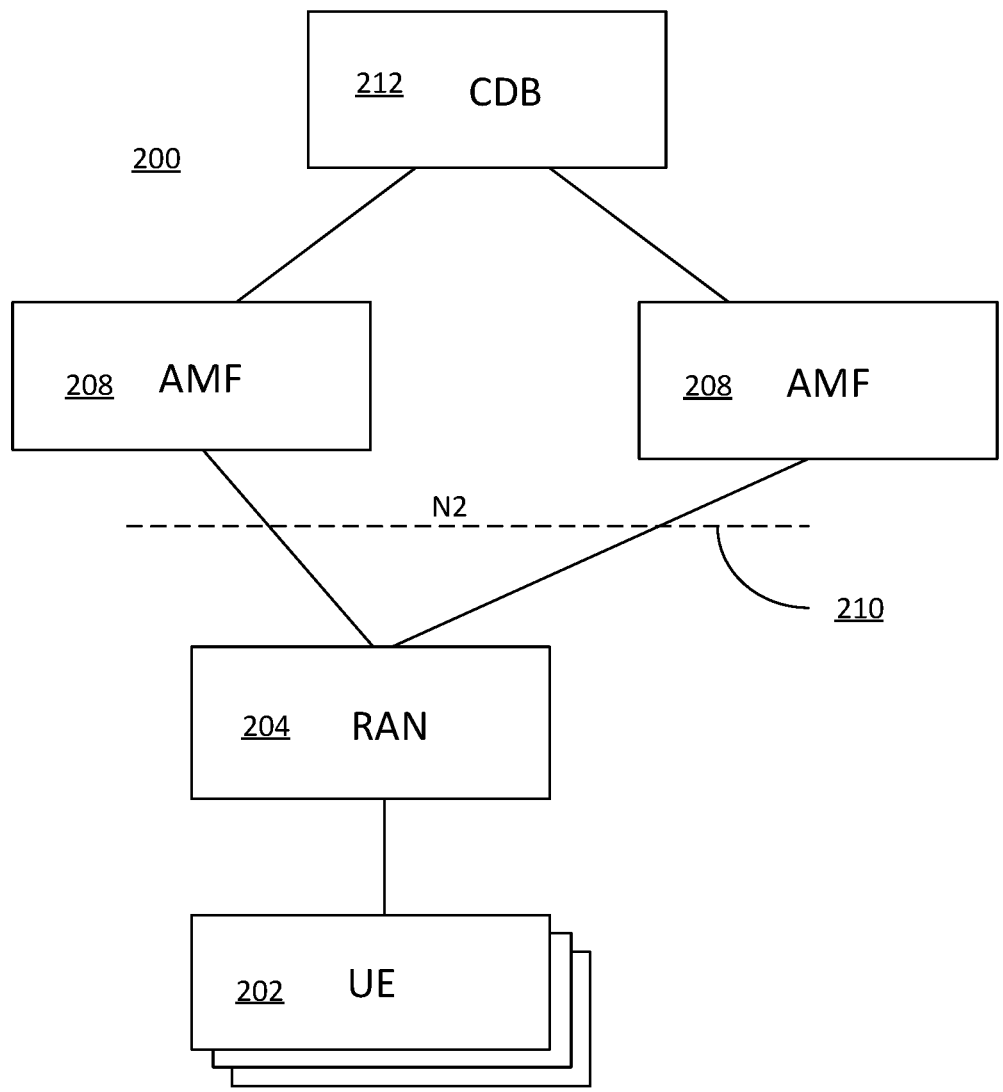
FIG. 2 illustrates an exemplary conventional architecture of a mobile communication system.
Figure 3:
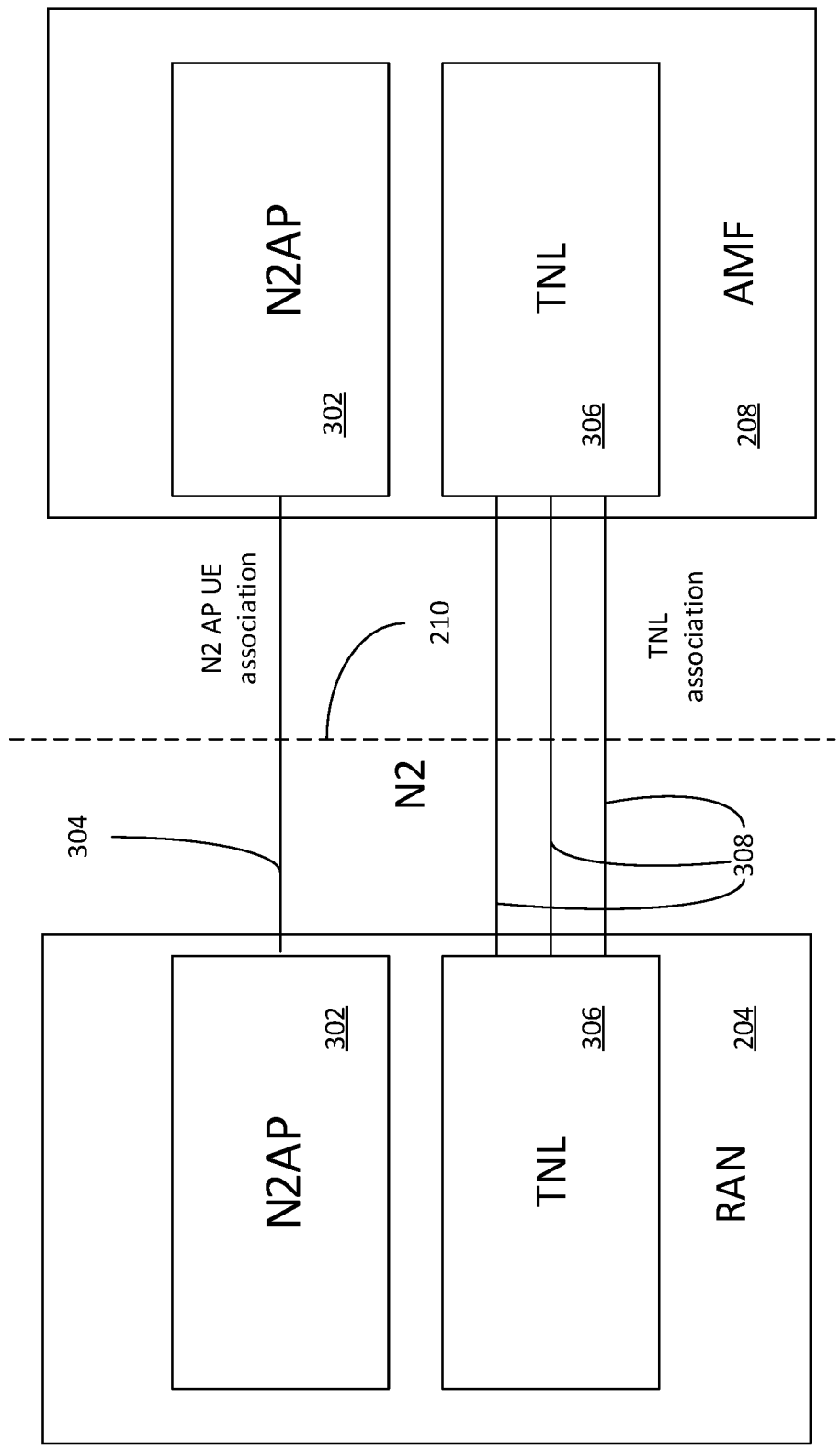
FIG. 3 is a block diagram of the conventional N2 interface of FIG. 2.
Figure 4:
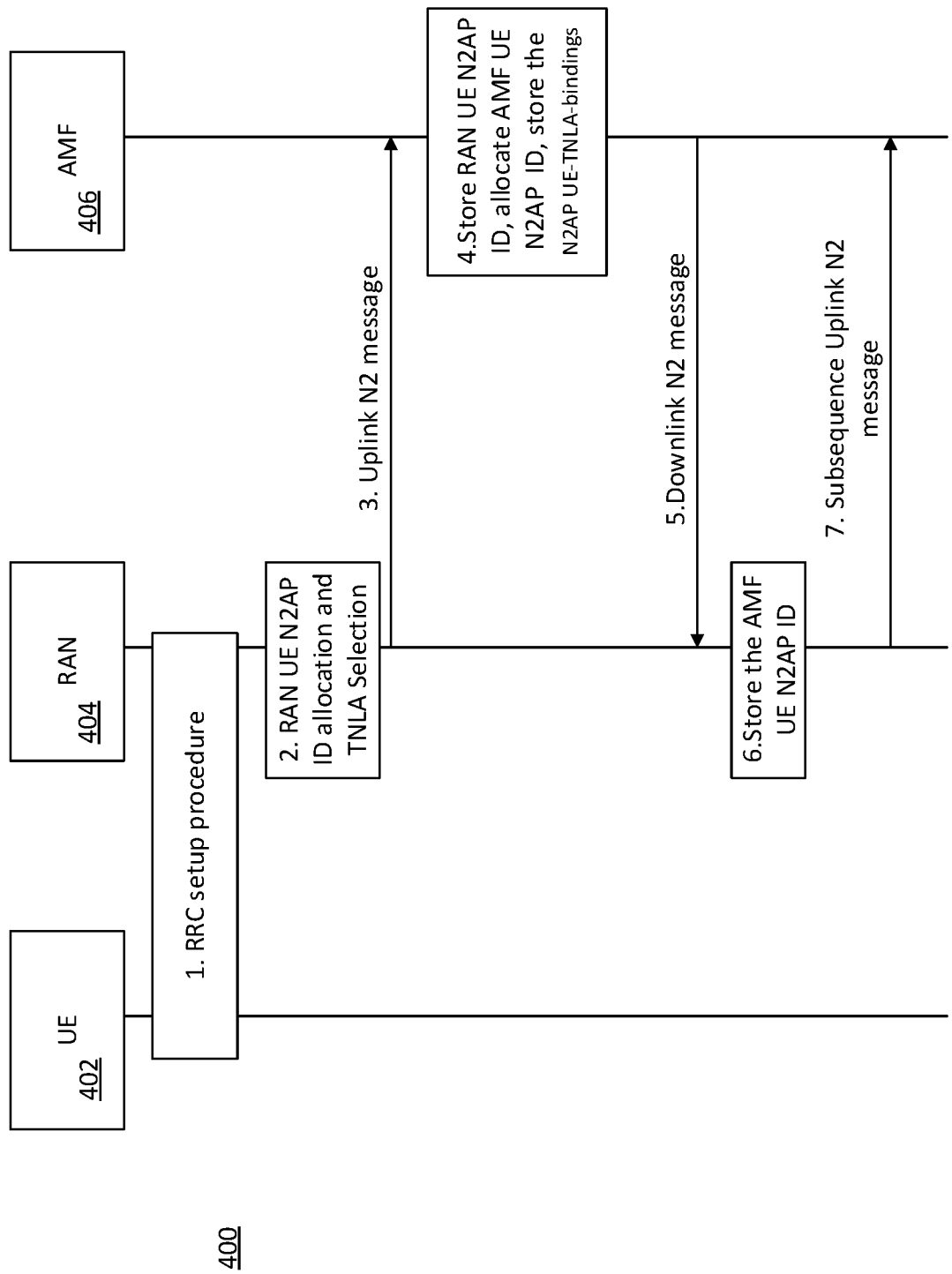
FIG. 4 illustrates a method of performing conventional binding.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As described below, the operations illustrated in FIG. 5 and FIG. 6 may refer to functional entities, such as UE, AMF, RAN, CDB, UPF, etc. (either in physical or virtual form), which are similar to those mentioned above with respect to conventional 5G communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

As discussed above, when user equipment (UE) is in the connected mode (e.g., communicating with a radio access network (RAN)), an operator of the UE may want to move a UE context from one AMF to another AMF (and to do so without changing the associated RAN). The UE context may be a term for a body of information related to a UE. The UE context information may be information that may facilitate a relationship between an AMF, RAN, and UE, for example. Examples of UE context information may include a UE identifier, a UE security state parameter, a UE mobile state parameter, a UE mobility parameter, a UE subscription parameter, and the like. When the UE is in connected mode with the RAN, the UE context information may also include RAN related context information such as N2AP UE associations. These N2AP UE associations may include information related to N2AP UE association links, such as an AMF UE N2AP ID allocated by an AMF and a RAN UE N2AP ID allocated by a RAN, as well as binding information between N2AP UE association links and a respective TNLA link. As discussed above, typical methods of moving a UE context from one AMF to another AMF may be resource intensive, especially for a UE.

Accordingly, systems and methods in accordance with various embodiments may provide robust adjustment of access and mobility management functions (AMF) (e.g., robust AMF adjustments) by performing a seamless handoff between AMFs without requiring a UE to perform radio resource control (RRC) setup procedures. Advantageously, robust AMF adjustments may provide savings in both communication overhead and processing resources for each of a UE, RAN, and AMF involved in a handoff (e.g., adjustment) from one AMF to another AMF.

Specifically, robust AMF adjustments may resolve AMF handoffs without actively involving a UE, in accordance with some embodiments. For example, robust AMF adjustments may coordinate transfer of a UE context between different AMFs, different AMFs and a RAN, and/or different AMFs, RANs, and a context database (CDB). This coordination may be performed on the backend (e.g., without UE involvement) and thus be seamless as perceived by a UE interacting with a RAN. This coordination may further resolve how a RAN is notified about UE context movement (from a first AMF to a second AMF) and/or update binding information, even in situations when a UE is in connect mode with a RAN.

Figure 5:
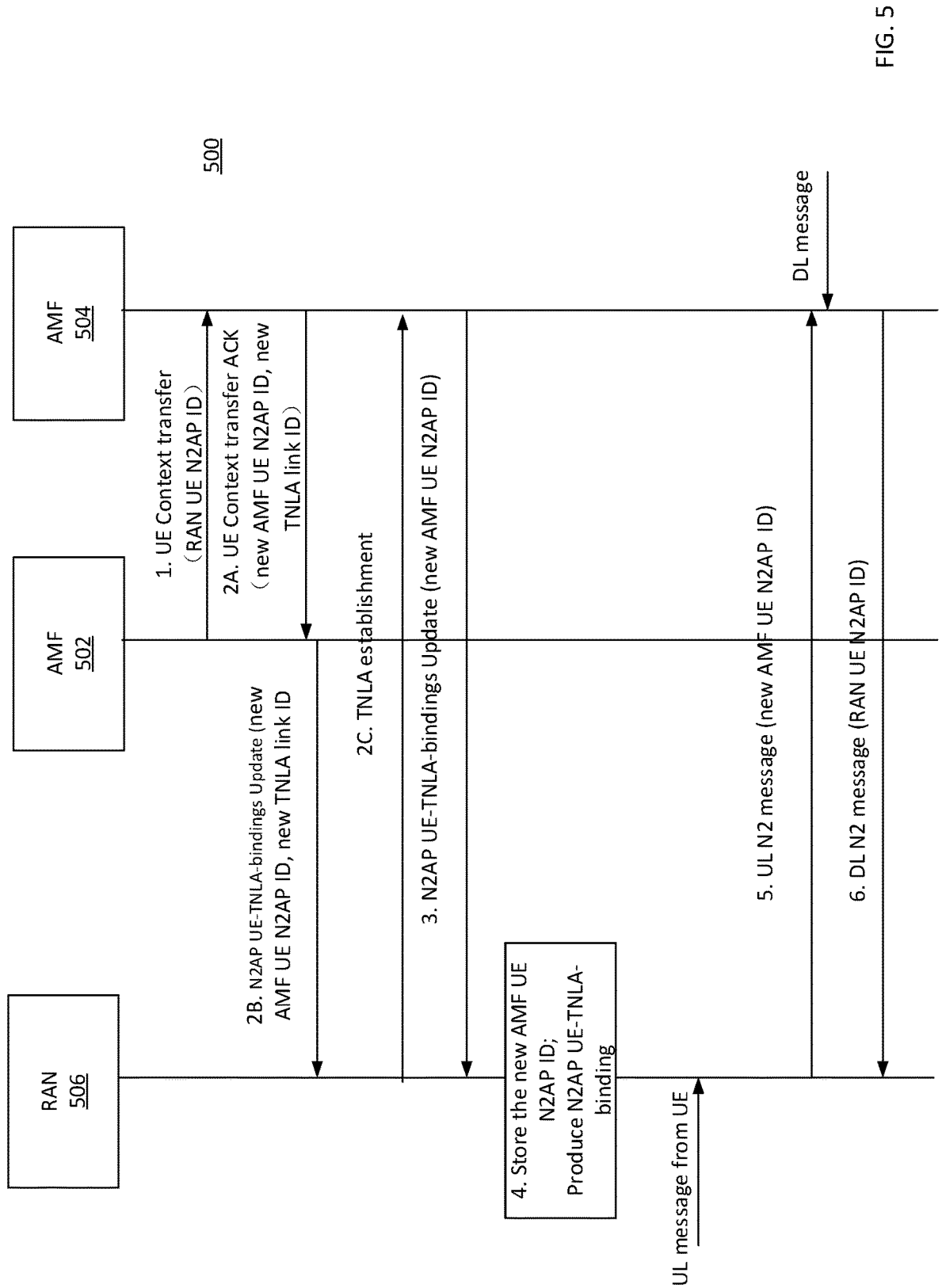
FIG. 5 illustrates a method of moving a UE context from a first AMF to a second AMF, where the first AMF and the second AMF do not share a context database, in accordance with some embodiments of the invention.

FIG. 5 illustrates a method 500 of moving a UE context from a first AMF 502 to a second AMF 504, where the first AMF 502 and the second AMF 504 do not share a context database, in accordance with some embodiments of the invention. At operation 1, the first AMF 502 may send a UE context transfer request signal containing the RAN UE N2AP ID to the second AMF 504. In certain embodiments, the UE context transfer request signal may be initiated by an operator of the first AMF 502, for reasons such as to shut down the first AMF 502 for maintenance or to load balance network traffic between the first AMF 502 and the second AMF 504. The RAN UE N2AP ID may be an identifier specific to the RAN 506 that the first AMF 502 may have previously interacted with. The RAN UE N2AP ID may also be specific for the RAN 506, with whom the second AMF 504 is to interact with after the hand off (e.g., transfer of a UE context from the first AMF 502 to the second AMF 504). In some embodiments, the RAN UE N2AP ID may be used to identify the UE context for the RAN 506. In some embodiments, the UE context can be derived from the identity of the associated UE.

In response to receiving the UE context transfer signal, the second AMF 504 may store the RAN UE N2AP ID. Also, in response to receiving the UE context transfer signal, the second AMF 504 may allocate an AMF-UE identifier for the second AMF 504. The AMF-UE identifier for the second AMF 504 may be different from an AMF-UE identifier for the first AMF 502. Examples of AMF-UE identifiers may include the AMF UE N2AP ID, discussed above. For simplicity of discussion, the AMF-UE identifier for the second AMF 504 may be termed as a "new" AMF UE N2AP ID (to distinguish from an "old" AMF-UE identifier for the AMF 502). Accordingly, this new AMF UE N2AP ID may be specific to the second AMF 504. This new AMF UE N2AP ID may also be specific to the RAN 506 and be based on the received RAN UE N2AP ID. Furthermore, in response to receiving the UE context transfer signal, the second AMF 504 may select a new TNLA link between itself and the RAN 506 for further communication with the RAN 506. This "new" TNLA link may be distinguished from an "old" TNLA link that may be used by the first AMF 502 to communicate with the RAN 506. TNLA links are discussed in further detail above. The new TNLA link may be identified via a new TNLA link identifier (e.g., new TNLA link address), as will be discussed below. In some embodiments, a TNLA link identifier may include a TNLA link address.

There are at least two ways that the method 500 may deliver the new AMF UE N2AP ID to the RAN 506 from the second AMF 504. These two methods are outlined in the alternative as operations 2A, 2B, and 2C, on the one hand, or as operation 3 on the other hand.

At operation 2A, the second AMF 504 may send a UE context transfer acknowledgement (ACK) signal that includes the new AMF UE N2AP ID and the new TNLA link identifier for the second AMF 504. The UE context transfer ACK signal may be sent from the second AMF 504 to the first AMF 502.

At operation 2B, the first AMF 502 (in response to receiving the UE context transfer ACK signal) may send a N2AP UE-TNLA bindings update signal to the RAN 506. The N2AP UE-TNLA bindings update signal may include the new AMF UE N2AP ID and the new TNLA link identifier for the second AMF 504.

At operation 2C, the RAN 506 may establish the new TNLA link with the second AMF 504 by using the new TNLA link identifier for the second AMF 504, if the new TNLA link with the second AMF 504 was not already established (e.g., if the RAN 506 has not already been communicating with the second AMF 504 via the new TNLA link prior to receiving the N2AP UE-TNLA bindings update signal). The new TNLA link may be established with the second AMF 504 using the new TNLA link identifier for the second AMF 504. Accordingly, the establishment of the new TNLA link between the RAN 506 and the second AMF 504 may be performed in response to receiving the N2AP UE-TNLA-bindings update signal.

Operation 3 may be performed in alternative embodiments that do not perform operations 2A, 2B and 2C, as discussed. In operation 3, the second AMF 504 may send the N2AP UE-TNLA bindings update signal (discussed above) to the RAN 506 via the new TNLA link (discussed above) selected by the second AMF 504. The N2AP UE-TNLA bindings update signal may include the new AMF UE N2AP ID. This operation can be used when the new TNLA link between second AMF 504 and RAN 506 has been established prior to operation 3.

In operation 4, the RAN 506 may store the new AMF UE N2AP ID. The RAN 506 may also produce an N2AP UE-TNLA binding at the RAN 506 relative to the AMF 504. For example, by producing an N2AP UE-TNLA binding, the RAN may generate or update a binding or association between the N2AP UE association link and the new TNLA link (between the RAN 506 and the second AMF 504).

If the RAN 506 receives a subsequent uplink (UL) message (e.g., a message from a UE sent after the completion of operation 4) from the UE associated with the UE context, operation 5 may be performed. In operation 5, the RAN 506 may deliver a subsequent UL N2 message (e.g., a message delivered via the N2 interface, discussed above) based on the subsequent UL message. The subsequent UL N2 message may be delivered via the new TNLA link to the second AMF 504. The subsequent UL N2 message may include the new AMF UE N2AP ID (produced by the second AMF 504, as discussed above) so that the second AMF 504 may identify the UE context associated with the UE that sent the subsequent UL message.

If the second AMF 504 receives a subsequent downlink (DL) message from an SMF (e.g., hSMF 122 (FIG. 1)), at operation 6, the AMF 504 will generate a DL N2 message and deliver it to the RAN 506 via the N2 interface. In operation 6, a subsequent DL N2 message (e.g., for transmission via the N2 interface, discussed above) may be produced based on the subsequent DL message. The subsequent DL N2 message may be delivered from the second AMF 504 to the RAN 506 (for delivery to the UE associated with the UE context). The subsequent DL N2 message may be delivered via the new TNLA link. The subsequent DL N2 message may include the RAN UE N2AP ID so that the RAN 506 may identify the UE.

Figure 6:
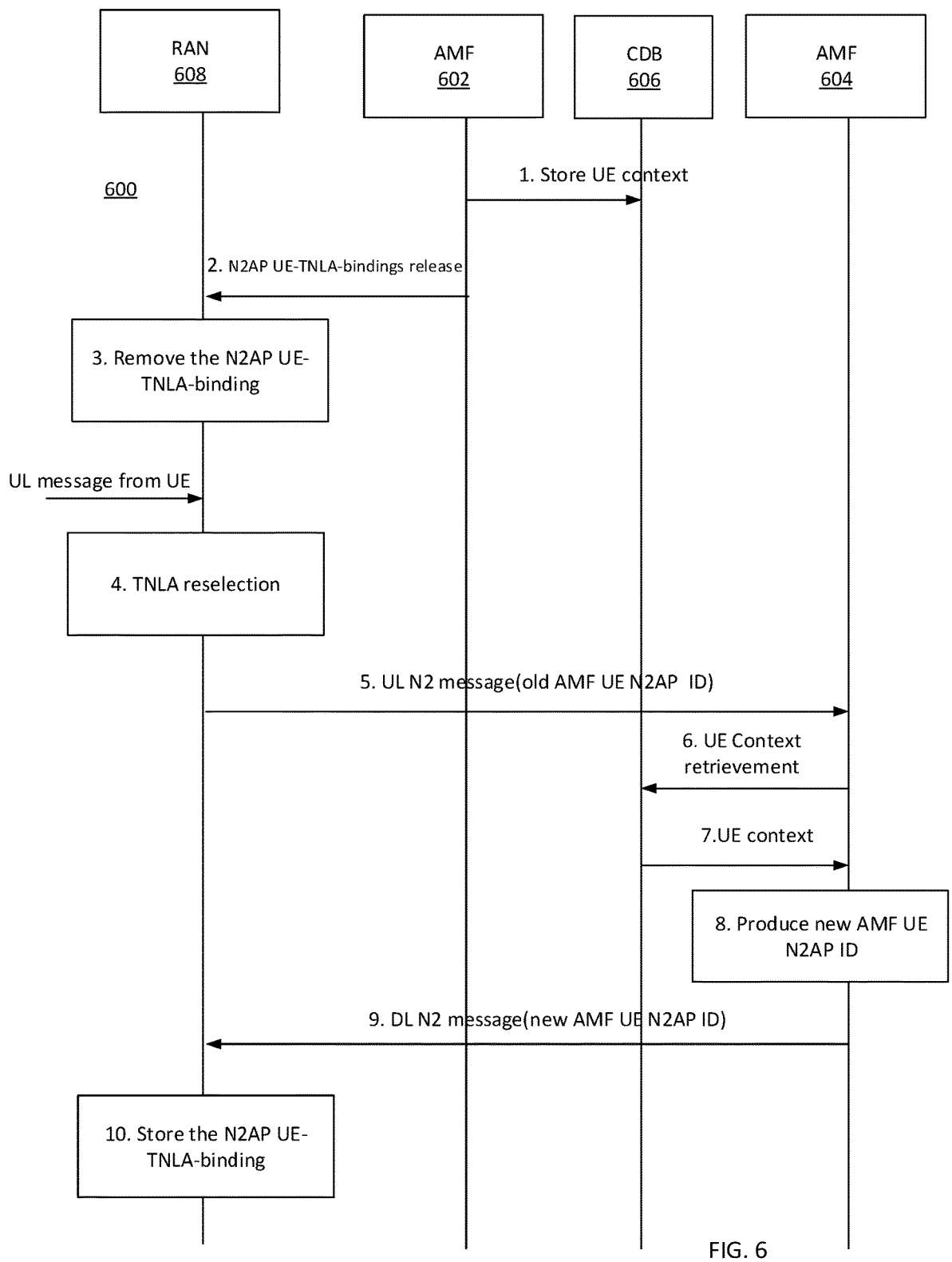
FIG. 6 illustrates a method of moving a UE context from a first AMF to a second AMF, where the first AMF and the second AFM share a context database, in accordance with some embodiments of the invention.

FIG. 6 illustrates a method 600 of moving a UE context from a first AMF 602 to a second AMF 604, where the first AMF 602 and the second AFM 604 share a context database 606 (CDB), in accordance with some embodiments of the invention. The CDB 606 may be a database or any type of data store accessible to the first AMF 602 and the second AMF 604. The method 600 may reflect embodiments in which AMFs (e.g., the first AMF 602 and the second AMF 604) are part of an AMF set in virtue of sharing the CDB 606.

At operation 1, the first AMF 602 may store a UE context in the CDB 606. The UE context may be generated and/or maintained by the first AMF 602 and initially stored at the first AMF 602 before being stored in the CDB 606.

At operation 2, when the AMF 602 is to no longer host a specific UE context (and/or a collection of UE contexts), the first AMF 602 may send a N2AP UE-TNLA bindings release signal to the RAN 608. The N2AP UE-TNLA bindings release signal may indicate to the RAN 608 that an old TNLA link to AMF 602 cannot be used for this UE. The old TNLA link may be termed as "old" to indicate that the old TNLA link between the RAN 608 and the first AMF 602, which may have previously been used, is now old (e.g., out of date) and should no longer be used. The N2AP UE-TNLA bindings release signal may also include a RAN UE N2AP ID, which may identify the UE context for the RAN 608. For simplicity of discussion, the UE context in the N2AP UE-TNLA bindings release signal may be termed as a released UE context. In some embodiments, the UE context can be derived from the identity of the associated UE.

At operation 3, the RAN 608 may remove the N2AP UE-TNLA binding for the released UE context identified by the RAN UE N2AP ID. By removing the N2AP UE-TNLA binding, the RAN 608 may no longer use the old TNLA link towards the first AMF 602 for the released UE context identified by the RAN UE N2AP ID. However, the RAN 608 may still maintain a N2AP UE association (e.g., an association between the RAN UE N2AP ID and an old AMF UE N2AP ID (discussed further below)) locally.

At operation 4, the RAN 608 may perform a TNLA link reselection in response to receiving an uplink (UL) message from the released UE associated with the released UE context. The TNLA link reselection will be a selection of a TNLA link from the available TNLA links between the RAN 608 and AMFs within the AMF set, which may include the second AMF 604. As discussed above, the AMF set may include AMFs that have access to the CDB 606 (such as to store and retrieve information concerning a UE context from the CDB 606). Accordingly, the RAN 608 may select a TNLA link that connects the RAN 608 to the second AMF 604. For ease of discussion, the selected TNLA link that connects the RAN 608 to the second AMF 604 may be termed as a selected TNLA link. In certain embodiments, the available TNLA links may be a collection of all the TNLA links that the RAN 608 may choose from to communicate with AMFs of the AMF set. The available TNLA links may be predetermined and already known to the RAN 608 prior to operation 4.

At operation 5, the RAN 608 may send an uplink (UL) N2 message based on a UL message received from the released UE context. The UL N2 message may be sent via the N2 interface, discussed above. The UL N2 message may also be sent from the RAN 608 via the selected TNLA link (discussed above in connection with operation 4) for receipt by the second AMF 604. The UL N2 message may include an old AMF UE N2AP ID that identifies, and is associated with, the first AMF 602. The old AMF UE N2AP ID may also be associated with the released UE context.

Further to the old AMF UE N2AP ID, by communicating with the first AMF 602 concerning the released UE context, the RAN 608 may have referenced a first AMF-UE identifier. An example of a first AMF-UE identifier is the old AMF UE N2AP ID for the first AMF 602. The term "old" is used for ease of discussion to differentiate with a "new" AMF UE N2AP ID associated with the second AMF, as will be discussed below. The old AMF UE N2AP ID may have been produced by the first AMF 602 and sent to the RAN 608 from the first AMF 602.

Operation 6 may be performed in response to receiving the UL N2 message at the second AMF 604 and if the second AMF 604 does not already have the released UE context available locally (e.g., in local memory) at the second AMF 604. Otherwise, if the second AMF already has the released UE context available locally, operation 6 and operation 7 may be skipped and the method 600 may move to operation 8.

At operation 6, in response to receiving the UL N2 message at the second AMF 604 and if the second AMF 604 does not already have the released UE context available locally, the second AMF 604 may send a UE context retrievement signal to the CDB 606. The UE context retrievement signal may include the old AMF UE N2AP ID, which references the released UE context.

At operation 7, in response to receiving the UE context retrievement signal, the CDB 606 may fetch the released UE context and send the released UE context to the second AMF 604. The released UE context may be sent from the CDB 606 to the AMF 604 via a reply signal (e.g., in response to receiving the UE context retrievement signal). The CDB 606 may fetch (e.g., retrieve) the released UE context based on the old AMF UE N2AP ID in the UE context retrievement signal.

At operation 8, the second AMF 604 may allocate (e.g., produce) a new AMF UE N2AP ID, associated with the second AMF 604 and also associated with the released UE context. The new AMF UE N2AP ID may be used for future transactions with the second AMF 604 concerning the released UE context (and, accordingly, the released UE).

At operation 9, the second AMF 604 may send a downlink (DL) N2 message to the RAN 608. The DL N2 message may be sent via the N2 interface, discussed above. The DL N2 message may also be sent to the RAN 608 via the selected TNLA link (discussed above in connection with operation 4) from the second AMF 604. The DL N2 message may include the new AMF UE N2AP ID.

At operation 10, the RAN 608 may store the new AMF UE N2AP ID. Using the new AMF UE N2AP ID, the RAN 608 may deliver any subsequent N2 UL messages (which may be provoked by subsequent UL messages received by the RAN 608 from the released UE after operation 10) via the selected TNLA link.

While various embodiments of the invention have been described above, they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure is not limited to the above-described exemplary embodiments.

Additionally, any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be present, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, software, or any combination of these techniques. To illustrate this interchangeability of hardware, firmware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation would not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA), or other programmable logic device, or any combination of these implementations. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented by executing software stored on a computer-readable medium. Computer-readable media includes both computer storage media and communication media including any medium that can transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can store desired program code in the form of instructions or data structures and that can be accessed by a computer.

In this document, the terms "module" or "unit" as used herein, refer to software, firmware, hardware, and any combination of these elements for performing the associated functions described herein. Additionally, for purpose of discussion, the various modules or units are described as discrete modules or units; however, as would be apparent to one of ordinary skill in the art, two or more modules or units may be combined to form a single module or unit that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   receiving, by a second access and mobility management function (AMF), a radio access network (RAN)-user equipment (UE) identifier from a first AMF, the RAN-UE identifier configured to identify a UE for a RAN, wherein the RAN-UE identifier is a RAN UE N2AP ID;
   producing, by the second AMF, an AMF-UE identifier, the AMF-UE identifier configured to identify the UE for the second AMF, wherein the AMF-UE identifier is an AMF UE N2AP ID;
   selecting, by the second AMF, a transport network layer association (TNLA) link to the RAN; and
   sending, by the second AMF, the AMF-UE identifier to the RAN via the TNLA link.

2. The method of claim 1, wherein:
   the RAN-UE identifier is further configured to identify a UE context for the RAN,
   the AMF-UE identifier is further configured to identify the UE context for the second AMF, and
   the UE context is associated with UE context information, wherein the UE context information comprises information selected from the group consisting of: a UE identifier, a UE security state parameter, a UE mobile state parameter, and a UE mobility parameter.

3. An apparatus, comprising:
   a receiver configured to receive a radio access network (RAN)-user equipment (UE) identifier from a first access and mobility management function (AMF), the RAN-UE identifier configured to identify a UE for a RAN,
   wherein the RAN-UE identifier is a RAN UE N2AP ID;
   at least one processor configured to:
      produce an AMF-UE identifier, the AMF-UE identifier configured to identify the UE for a second AMF, wherein the AMF-UE identifier is an AMF UE N2AP ID; and
      select a transport network layer association (TNLA) link to the RAN; and a transmitter configured to:
   send the AMF-UE identifier to the RAN via the TNLA link.

4. The apparatus of claim 3, wherein:
   the RAN-UE identifier is further configured to identify a UE context for the RAN,
   the AMF-UE identifier is further configured to identify the UE context for the second AMF, and
   the UE context is associated with UE context information, and wherein the UE context information comprises information selected from the group consisting of: a UE identifier, a UE security state parameter, a UE mobile state parameter, and a UE mobility parameter.

* * * * *